United States Patent [19]
Miller

[11] 3,930,627
[45] Jan. 6, 1976

[54] RADIATION SHIELDING AND GAS DIFFUSION APPARATUS

[75] Inventor: Robert C. Miller, Encino, Calif.

[73] Assignee: Summa Corporation, Culver City, Calif.

[22] Filed: Jan. 29, 1975

[21] Appl. No.: 545,094

Related U.S. Application Data

[63] Continuation-in-part of Ser. No. 403,167, Oct. 3, 1973, abandoned.

[52] U.S. Cl. .................. 244/121; 60/39.5; 138/38; 138/177; 239/128; 239/265.11; 343/18 E
[51] Int. Cl.² .......................................... B64C 1/40
[58] Field of Search ....... 244/121, 163, 17.11, 3.16; 239/127.1, 127.3, 265.11, 265.17, 265.19, 265.25, 265.27, 128; 181/36 B, 33 HC; 60/39.5, 267, 271, 264, 265; 165/135; 138/38, 140–143, 172, 177, DIG. 10; 137/334, 338; 343/18 E, 18 R

[56] References Cited
UNITED STATES PATENTS

| | | | |
|---|---|---|---|
| 1,888,749 | 11/1932 | Urquhart | 244/74 UX |
| 2,548,563 | 4/1951 | Smith | 60/319 UX |
| 2,913,009 | 11/1959 | Kuthe | 138/38 |
| 3,210,934 | 10/1965 | Smale | 60/264 UX |
| 3,289,943 | 12/1966 | Thomas et al. | 239/265.11 X |
| 3,372,874 | 3/1968 | Colville et al. | 239/265.11 X |
| 3,448,583 | 6/1969 | Maguire | 60/271 |
| 3,449,189 | 6/1969 | Hatch | 60/271 X |
| 3,612,212 | 10/1971 | MacDonald | 181/60 X |
| 3,631,678 | 1/1972 | Reed | 60/264 |
| 3,685,547 | 8/1972 | Tuppeny, Jr. | 138/38 X |
| 3,815,360 | 6/1974 | Wellinitz | 60/271 |
| 3,817,030 | 6/1974 | Renius et al. | 60/27 |

FOREIGN PATENTS OR APPLICATIONS

| | | | |
|---|---|---|---|
| 552,142 | 4/1923 | France | 60/319 |
| 835,615 | 12/1938 | France | 60/320 |
| 848,965 | 11/1939 | France | 60/320 |
| 588,655 | 5/1947 | United Kingdom | 60/320 |
| 1,238,699 | 7/1971 | United Kingdom | 165/179 |

Primary Examiner—Duane A. Reger
Assistant Examiner—Paul E. Sauberer
Attorney, Agent, or Firm—George F. Smyth

[57] ABSTRACT

A device for shielding a heated surface from infrared detection through an exhaust opening adjacent the heated surface which comprises an exhaust gas conducting member adapted to receive heated exhaust gases from the exhaust opening with the member having a configuration which blocks the exhaust opening from line-of-sight view through the outlet to the member. The exhaust gas conducting member includes apparatus to inhibit heat transfer across its interior surface while promoting heat transfer through the wall of the member. Additionally there is provided a diffusion device for breaking up a main stream of heated exhaust gas into a plurality of smaller streams to reduce infrared radiation from the exhaust gas which includes a body adapted to receive heated exhaust gas with insulation apparatus to maintain the exterior surface of the body at a relatively low temperature. A plurality of openings in the body provide discharge of smaller streams of exhaust gas. The openings may be shaped to provide a cross-sectional configuration for the smaller streams of exhaust gas which promote dissipation of heat and energy and which reduce the emissivity of the gas streams.

80 Claims, 35 Drawing Figures

RADIATION SHIELDING AND GAS DIFFUSION APPARATUS

This application is a continuation-in-part of our prior copending U.S. application Ser. No. 403,167, filed Oct. 3, 1973.

A power source for an aircraft generates heat which produces hot metal surfaces and also a stream of heated exhaust gas. These sources of infrared radiation, i.e., hot metal surfaces and a heated stream of exhaust gas, provide a target source for heat-seeking missiles which lock on the target source and are, thereby, led directly to the power source for the aircraft.

In providing an aircraft whose power source is not easily discernible by a heat-seeking missile, a first step would be to insulate the surfaces of the aircraft engine. An insulation material which is admirably suited for this purpose is disclosed in commonly assigned U.S. application Ser. Nos. 352,218, filed Apr. 18, 1973 and 352,309, filed Apr. 18, 1973. Application Ser. No. 352,318 is a continuation-in-part of application Ser. No. 272,468, filed July 17, 1972, and application 352,309 is a continuation-in-part of application Ser. No. 272,469, filed July 17, 1972.

The insulation of the aircraft engine surface is, however, only a first step in reducing infrared radiation from the aircraft power source. Even when the aircraft engine is well insulated, hot metal surfaces within the engine interior may still be viewed by a heat-seeking missile through an opening for exhaust gases positioned adjacent the hot interior surfaces. Thus, in addition to insulating the exterior surfaces of the engine, it is also desirable to, in some way, block the metal surfaces within the engine interior from view through the exhaust gas opening while still providing an opening for discharge of the exhaust gases.

It is also desirable to reduce infrared radiation from the hot plume of exhaust gases emitted by an aircraft engine to shield the aircraft power plant from detection by a heat-seeking missile. To accomplish this, the main stream of exhaust gas from the engine may, in some manner, be broken up into a plurality of smaller streams of exhaust gas to promote loss of heat and energy from the exhaust gases and to reduce its emissivity. Also, to promote dissipation of heat and energy from the exhaust gas, the shape of the exhaust gas stream might be changed in some manner to provide a shape which promoted dissipation of heat and energy and a reduction in its emissivity. Still further, the dissipation of heat and energy from the exhaust gases might be maximized by both breaking up the main stream of exhaust gas into a plurality of smaller streams and also altering the shape of the smaller streams to promote dissipation of heat and energy and the emissivity of the smaller streams.

By diffusing the exhaust gas stream to dissipate its heat and energy and to reduce its emissivity while also blocking interior hot metal surfaces from view by a heat-seeking missile and insulating the engine surfaces, all of the various sources of infrared radiation from an aircraft power plant might be controlled to provide an overall system having a low degree of infrared radiation. Such a system would be much more difficult to detect by a heat-seeking missile than presently existing systems and would, therefore, greatly reduce the number of aircraft which are lost in combat through destruction by heat-seeking missiles.

In providing an aircraft power plant with significantly reduced levels of infrared radiation, I have provided a device for shielding the heated interior engine surfaces from infrared detection through an exhaust opening adjacent the heated surfaces. To accomplish this result, an exhaust gas conducting member is provided which is adapted to receive heated exhaust gases from the exhaust opening. The gas conducting member has an interior surface and an exterior surface which are separated by a wall as well as an inlet for receipt of heated exhaust gases and an outlet for discharge of exhaust gases. The member is provided with a configuration which blocks the inlet to the member from line-of-sight view through its outlet. Thus, the heat-seeking missile sees only the exhaust gas conducting member and is prevented from looking into the engine interior through the exhaust opening for the engine.

If the surfaces of the exhaust gas conducting member were permitted to reach a high temperature through heat exchange with the exhaust gases, a heat-seeking missile could then sight just as readily on the exhaust gas conducting member as it could have on heated metal surfaces within the engine. To prevent this result, means are also provided to inhibit heat transfer into the wall of the exhaust gas conducting member across the member's interior surface as well as promote heat transfer through the wall of the member. This provides rejection of heat at the interior surface and rapid removal of any heat accepted at the interior surface by heat transfer through the wall of the member. The overall result is that the surfaces of the exhaust gas conducting member are maintained at a relatively low temperature with respect to the temperature of the exhaust gas which passes through the member. Thus, there is no significant radiation from the surfaces of the exhaust gas conducting member and the member does not present a suitable target area for a heat-seeking missile.

In promoting the dilution of the exhaust gases from the engine while reducing heat transfer across the interior surface of the gas conducting member, means may be provided for introducing a boundary layer of a cooling gas adjacent the interior surface of the gas conducting member. This helps to maintain the interior surface at a relatively low temperature while promoting the dilution and cooling of the exhaust gases.

In reducing the heat transfer to the exhaust gas member across its interior surface, means may be provided on the interior surface to reduce the heat transfer contact area between the interior surface and the heated exhaust gas. In reducing the heat transfer contact area on the interior surface of the exhaust gas conducting member, indentations may be provided in the interior surface to form recessed pockets therein. The width of the indentations is sufficiently small so as to impede the entrance of exhaust gases into the pockets. Thus, the available heat transfer area on the interior surface of the exhaust gas conducting member is reduced in relation to the area which is removed from the interior surface by the indentations.

In forming indentations on the interior surface of the exhaust gas conducting member, the indentations may take any of several forms. For example, the indentations may be in the form of slots, convolutions, serrations, or threads. Further, the indentations may be positioned, e.g., in a direction that is generally transverse to the direction of exhaust gas flow, so as to impede the flow of exhaust gases into the pockets formed by the indentations.

Conveniently, the exhaust gas conducting member may have the configuration of an elbow although other configurations may be employed, such as, for example, an S-configuration, or a U-configuration. To promote heat transfer through the wall of the exhaust gas conducting member, the member is preferably formed of a metal such as aluminum having high heat conductivity. Also, to promote heat transfer through the wall of the exhaust gas conducting member, the exterior surface of the member may include means to increase the rate of heat rejection from the exterior surface. Conveniently, the exterior surface of the member may include fin structures of various configurations to increase the available area for heat rejection.

In conjunction with the use of an exhaust gas conducting member, diffusion means may be positioned to break up the stream of exhaust gas emitted by the exhaust gas conducting member into a plurality of smaller streams to, thereby, dissipate the exhaust gas stream and to reduce its emissivity. Also, the exhaust gas conducting member may include means to change the shape of the exhaust gas stream to a shape having a lower emissivity and one from which heat and energy are more readily dissipated. To provide optimum dissipation of heat and energy from the exhaust gas stream, the stream may be broken up into a plurality of smaller streams and, additionally, the shape of the smaller streams may be such as to promote the dissipation of heat and energy from the smaller streams and to reduce the emissivity of the smaller streams.

In breaking up the exhaust gas stream into a plurality of smaller streams, it is desirable that the streams not be positioned in such a manner that the infrared radiation emitted by one stream would reinforce that emitted by another stream or that the smaller streams can recombine to form a larger stream or streams having a higher emissivity. Also, it is desirable that the smaller streams be positioned such that one stream can block an adjacent stream or streams from view. In this instance a heatseeking missile would see essentially only the infrared radiation from one stream and would not be able to sight on or integrate the radiation from the streams which were blocked from view. Thus, the smaller streams are preferably randomly positioned with respect to each other so that a region of higher temperature in one smaller stream does not reinforce the infrared signal provided by a region of higher temperature in another smaller stream.

In addition to providing a means for shielding heated interior engine parts of an aircraft engine from line-of-sight view by a heat-seeking missile, I have also provided a diffusion device for breaking up a main stream of heated exhaust gas into a plurality of smaller streams. The diffusion device includes a body which is adapted to receive a main stream of heated exhaust gas from an aircraft engine. Insulation means are provided on either the interior or exterior of the body to maintain the exterior surface of the body at a relatively low temperature with respect to the temperature of the heated exhaust gas. A plurality of openings are then provided in the body such that the main stream of exhaust gas is broken into a plurality of smaller streams which are separately discharged through the openings from the body.

The diffusion device may have a variety of configurations, such as an ocarina configuration, a flute configuration, or a marimba configuration as will be described subsequently. Moreover, the openings in the body of the diffusion device may be shaped to provide a cross-sectional configuration to the smaller streams of exhaust gases which promote dissipation of heat and energy from the smaller streams. For example, the smaller streams may be provided with a generally rectangular or an elliptical cross-sectional configuration, as opposed to a circular configuration, or the openings in the body may be varied in shape so as to provide a plurality of smaller exhaust gas streams having varying shapes.

If desired, exhaust gas conducting members may be combined with the diffusion device to shield the interior surfaces of the diffusion device from view by a heat-seeking missile through the openings in its body. The exhaust gas conducting members may be positioned to receive a smaller stream of exhaust gas from openings in the body with the exhaust gas conducting members having a configuration which blocks the openings from line-of-sight view. Means may also be provided to maintain the exhaust gas conducting members at a relatively low temperature with respect to the temperature of the exhaust gas such that a heat-seeking missile cannot use the exhaust gas conducting members as a target source. Means may also be provided on the exhaust gas conducting members to provide the smaller streams of exhaust gas with a shape or shapes that promote the dissipation of heat and energy from the smaller streams and also reduces the emissivity of the smaller streams. Thus, for example, the smaller streams may be provided with a generally rectangular or elliptical crosssectional configuration. The exhaust gas conducting members are preferably shaped to prevent impingement of the smaller streams of exhaust gas against the exterior surface of the body of the diffusion device or against the exterior surface of adjacent gas conducting members so that the exterior surface is not heated by the exhaust gas. Also, the exhaust gas conducting members and the smaller streams are preferably randomly positioned such that one conducting member or a region of higher temperature in one smaller stream does not reinforce the infrared signal provided by another conducting member or a region of higher temperature in another smaller stream.

The exhaust gas conducting members positioned to receive smaller exhaust gas streams from the diffusion device may have an interior surface and an exterior surface separated by a wall with means to impede heat transfer from the exhaust gas to the gas conducting member across its interior surface and to promote heat transfer through the wall of the gas conducting member. This may include means to reduce the heat transfer contact area between the interior surface and exhaust gas passing through the member which may take the form of indentations in the interior surface to form recessed pockets therein. The indentations may have a width which is sufficiently small to impede the entrance of heated exhaust gas into the pockets with the available heat transfer area on the interior surface being reduced in relation to the area removed from the interior surface by the indentations. Also, the exhaust gas conducting members are preferably formed of a metal having high heat conductivity and also may include an opening for introduction of cool air as a boundary layer adjacent the interior surface of the member. In promoting heat transfer through the wall of the gas conducting member, means may be provided on the exterior surface of the member to increase the rejection of heat from the exterior surface.

In order to more fully describe the invention with respect to preferred embodiments thereof, reference is made to the accompanying drawings in which.

Figure 1:
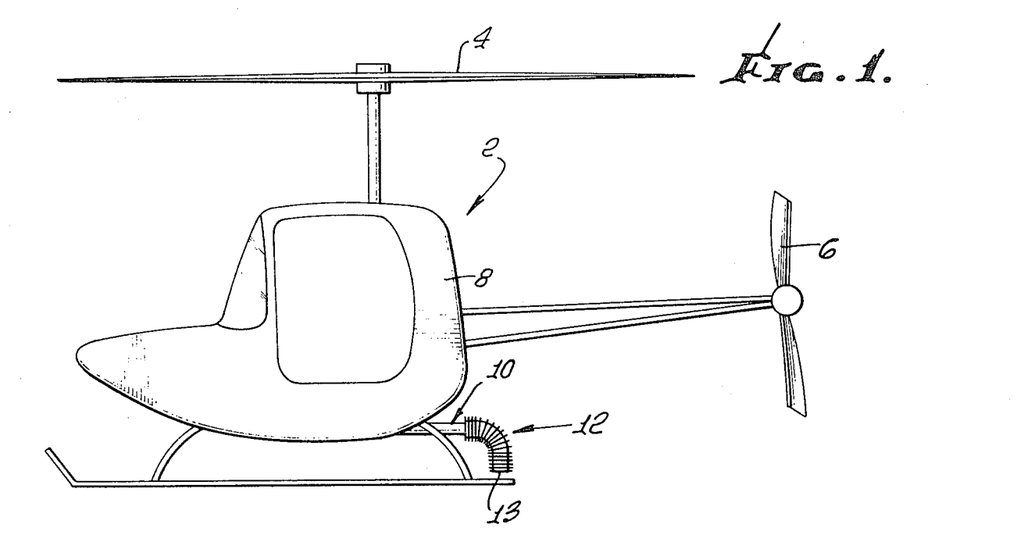
FIG. 1 is a side view of a helicopter having a means for preventing line-of-sight vision into the interior of the helicopter engine through an exhaust opening.

Turning to the drawings, FIG. 1 illustrates a helicopter, generally designated 2, having a main rotor 4, a tail rotor 6, and a body 8. The helicopter power source contained within the body 8 provides exhaust gases which are discharged through an engine exhaust 10 to which is connected an exhaust duct generally designated as 12. For ease in illustration, the exhaust duct 12 is shown as having an opening 13 which is directed downwardly from the helicopter 2. In actual usage, however, the opening 13 would not generally be pointed downwardly toward the ground. This would tend to make hot exhaust gases discharged from the opening 13 more easily discernible by a heat-seeking missile launched from the ground. Thus, for example, the exhaust duct 12 is preferably positioned to discharge exhaust gases in a transverse or an upward direction with respect to the aircraft such as the helicopter 2.

Figures 2, 3, 4, 5:
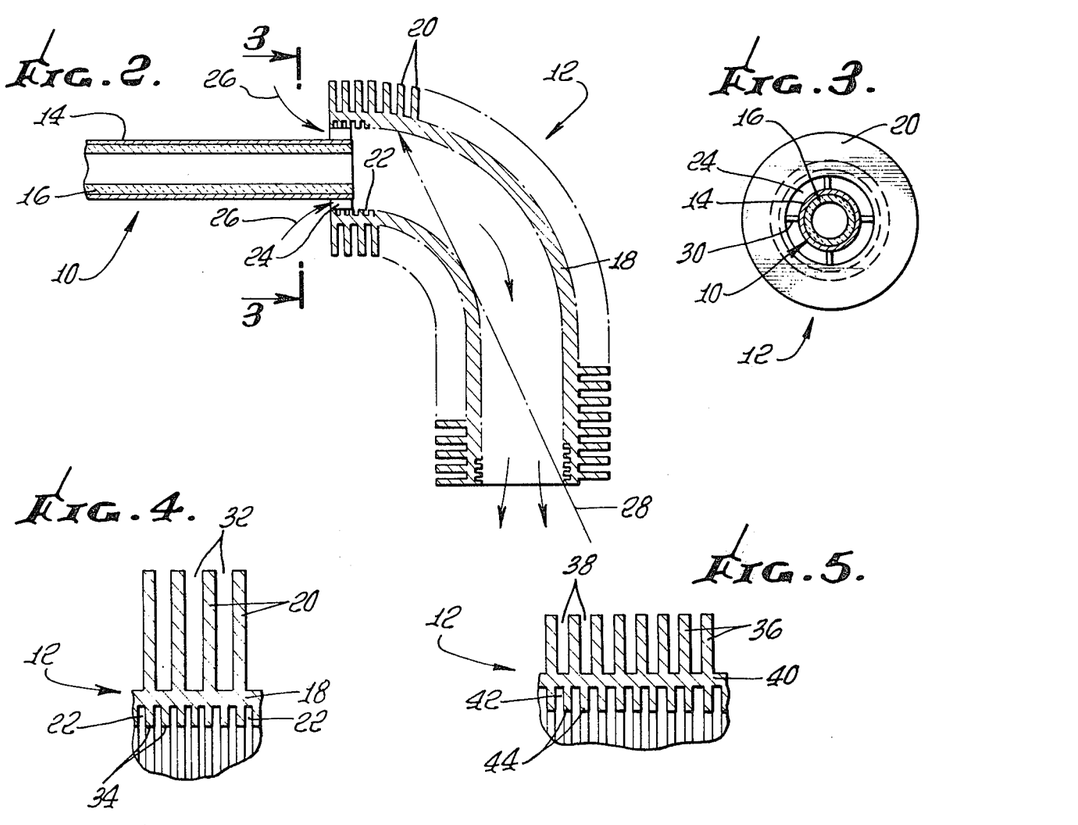
FIG. 2 is an enlarged side sectional view showing in detail the structure of the exhaust gas conducting member utilized in FIG. 1 in preventing line-of-sight vision into the interior of the helicopter engine.
FIG. 3 is an end sectional view taken along the line 3—3 of FIG. 2 illustrating the manner in which the exhaust gas conducting member is supported by the exhaust pipe from the helicopter engine with an opening through which cool air is introduced as a boundary layer adjacent the interior wall of the exhaust gas conducting member.
FIG. 4 is an enlarged partial side sectional view of the exhaust gas conducting member illustrating the manner in which the available heat transfer area on the exterior of the exhaust gas conducting member is increased while the available heat transfer area on the interior of the exhaust gas conducting member is reduced.
FIG. 5 is an enlarged partial side sectional view, similar to FIG. 4, showing a slightly different configuration for increasing the heat transfer area on the exterior of the exhaust gas conducting member while reducing the heat transfer area on its interior surface.

As shown in FIG. 2, the engine exhaust 10 includes a pipe 14 having insulation 16 to maintain the exterior surface of the pipe at a relatively low temperature to not emit a significant level of infrared radiation. The exhaust duct 12 includes a curved metallic wall 18 preferably having the configuration of an elbow with fins 20 provided on the exterior surface of the member and closely spaced serrations or slots 22 positioned on the interior surface of the member. An annular opening 24 adjacent the inlet to the exhaust duct 12 provides for air intake as indicated by the arrows 26 to form a boundary layer adjacent the interior surface of the duct at its inlet. Due to the configuration of the duct 12, the opening from the engine exhaust 10 is blocked from line-of-sight vision by a heat-seeking missile. Thus, the missile cannot look into the opening to view heated interior metal surfaces. The closest permitted line-of-sight vision to the opening from the exhaust 10, as illustrated by the arrow designated 28, views only the interior surface of the duct 12 and does not see the opening.

As shown in FIG. 3, which is a sectional view taken along the line 3—3 of FIG. 2, the duct 12 is supported by a spider 30 which connects the duct in spaced relation to the exterior surface of the engine exhaust 10. The spacing between the duct 12 and engine exhaust 10 provides the annular opening 24 for introduction of the cooling air.

In maintaining the surfaces of the exhaust duct 12 at a relatively low temperature, as shown in FIG. 4, the closely spaced serrations or slots 22 provide spacings 34 with the serrations or slots being sufficiently small to impede the entrance of heated exhaust gas. The effectively reduces the available heat transfer surface on the interior of the duct 12 in relation to the surface area removed by the slots or serrations 22 which is no longer available for heat transfer.

The duct wall 18 is formed of a metal having high heat conductivity. Thus, any heat which is transferred to the interior surface of the duct 12 is rapidly removed through the wall 18. To assist rapid transfer of heat through the wall 18, the fins 20 on the exterior surface of the duct 12 provide openings 32 which increase the effective area for rejection of heat on the exterior surface. Thus, heat conducted through the wall 18 to the exterior surface is rapidly rejected from the exterior surface.

The overall effect of reducing heat transfer to the duct 12 at its interior surface while rapidly removing any heat from the duct by heat transfer through the wall 18 and across the duct's exterior surface is to maintain both the interior and exterior surfaces of the duct at a relatively low temperature and preferably without an appreciable temperature difference between the temperatures of the interior and exterior surfaces. In tests which were performed, it was found that the structure of the duct 12 maintained the interior and exterior surfaces relatively cool so that no significant levels of infrared radiation were emitted from the surfaces.

In a similar structure, as shown in FIG. 5, the fins 36 are somewhat shorter than the fins 20 of FIG. 4 with the openings 38 being somewhat narrower than the openings 32. The serrations or slots 42 on the interior surface of the wall 40 are somewhat longer than the serrations 22 of FIG. 4 while the spacings 44 are approximately the same width as the spacings 34 of FIG. 4.

In a particular design having the general configuration shown in FIG. 4, the fins 20 had a height of one inch as measured from the exterior surface of the wall 18 with the openings 32 having a width of 3/16 of an inch and the fins having a width of 1/16 of an inch. The wall 18 had a thickness of 3/32 of an inch with the serrations or slots 22 having a depth of 5/32 of an inch as measured from the inside surface of the wall 18 and the spacings 34 and serrations 22 having a width of 1/16 of an inch. This particular configuration provided an effective heat transfer area on the exterior of the duct 12 which was 10.08 times the heat transfer area on the duct's interior surface. This was more than adequate to maintain the interior and exterior surfaces of the duct at relatively low temperatures, with the exhaust gas passing through the duct at temperatures in the order of about 1,000°F. or higher.

In a particular configuration similar to that illustrated in FIG. 5, the fins 36 had a height of ½ inch and a thickness of 1/16 of an inch to provide openings 38 having a width of ⅛ inch. The thickness of the wall 40 was 1/16 of an inch with the serrations or slots 42 having a depth of 5/32 of an inch and the spacings 44 and serrations 42 having a width of 1/16 inches. In this particular configuration, the ratio of the effective outside heat transfer area was 9.5 times that of the effective inside heat transfer area.

Figure 6:
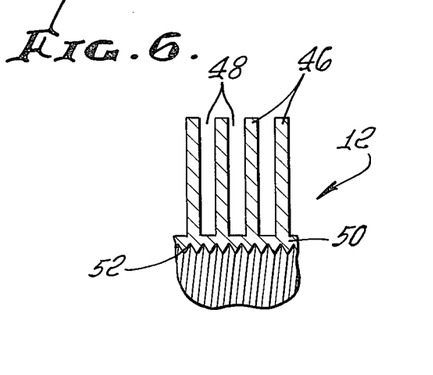
FIG. 6 is an enlarged partial side sectional view, similar to FIG. 4, illustrating an exhaust gas conducting member having a thread on its interior surface to reduce the available heat transfer area.
Figure 7:
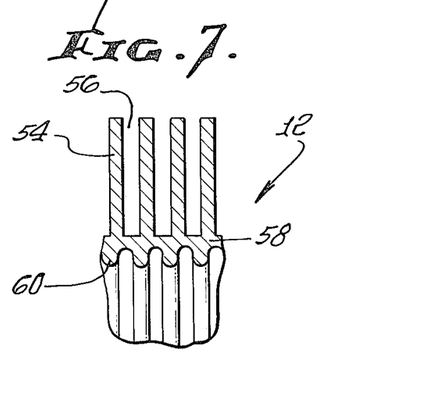
FIG. 7 is an enlarged partial side sectional view, similar to FIG. 4, in which the interior surface of the exhaust gas conducting member is convoluted.

As stated previously, various configurations may be employed to reduce the available heat transfer area on the interior surface of the duct 12. Thus, as shown in FIG. 6, threads 52 may be formed on the interior surface of the wall 50 with fins 46 positioned on the exterior surface of the wall to provide openings 48. Also, as shown in FIG. 7, convolutions 60 may be provided on the interior surface of the wall 58 with fins 54 on its exterior surface providing openings 56.

Figure 8:
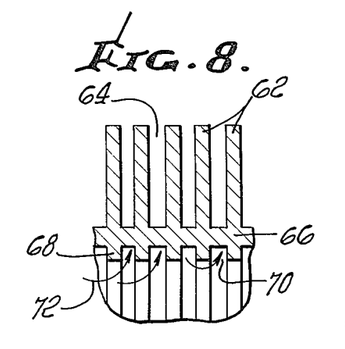
FIG. 8 is an enlarged partial side sectional view, similar to FIG. 4, demonstrating an undesirable condition when the indentations in the interior surface of the gas conducting member are too large and permit the ingress of heated exhaust gas into the pockets formed by the indentations.

FIG. 8 illustrates an undesirable condition which is to be avoided where the slots or serrations 70 are sufficiently wide to permit the entrance of heated exhaust gas 72 into the serrations. As illustrated, the spacings 68 are on the interior surface of wall 66 which has fins 62 on its exterior surface to define openings 64. In the undesirable situation shown in FIG. 8, the heat transfer area on the interior surface is actually increased which promotes the transfer of heat into the wall 66 through its interior surface. This condition is undesirable since it would provide an exhaust duct having hot metal surfaces which would serve as a target source for a heat-seeking missile.

In the embodiment of the invention illustrated in FIGS. 1–5, the exhaust duct 12 has a generally circular cross-sectional configuration. However, the duct may have any desired shape and it is often desirable to provide the duct with a noncircular shape to produce a cross-sectional configuration that promotes rapid dissipation of heat and energy from the emitted exhaust gas stream.

Figure 9:
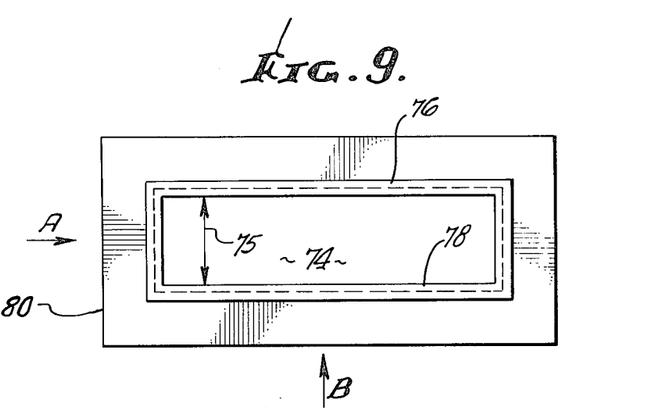
FIG. 9 is a view of an outlet from an exhaust gas conducting member which provides a rectangular opening such that the stream of emitted exhaust gas has a generally rectangular configuration.

As illustrated in FIG. 9, the outlet from the exhaust duct may provide a rectangular opening 74 with the wall 76, spacings 78 and fins 80 also having a corresponding rectangular configuration. The opening 74 is relatively long but only moderately deep, as indicated by the dimension 75. This produces a cross-sectional configuration in the emitted stream of exhaust gas which promotes dissipation of heat and energy from the emitted gas. In addition to being rectangular, the exit from the exhaust duct can take any number of configurations, such as, for example, an elongated elliptical opening to more rapidly dissipate heat and energy from the emitted exhaust gases.

The radiation emitted by a stream of exhaust gas is dependent upon the components of the stream, their temperature, their partial pressures and the shortest distance between the center of the gas stream aand its outer envelope. Also, the emitted radiation viewed by a heat-seeking missile is dependent on the area of the stream presented for view by the missile. Referring to FIG. 9, a smaller area of the exhaust gas stream would be observed by a missile approaching in the direction of arrow A than the area observed by a missile approaching in the direction of arrow B. The generally rectangular gas stream provided by the structure of FIG. 9 would be dissipated more rapidly and would not extend as far from the aircraft structure as an equivalent gas stream of circular cross-section. This would also produce a reduction in the area of the gas stream which could be viewed by a heat-seeking missile.

The components of a heated exhaust gas stream which emit infrared radiation are water vapor, carbon dioxide and carbon particles. The partial pressures of the gaseous components is dependent on temperature and thus the dilution or dispersion of the exhaust gas stream to reduce its temperature will also cause a reduction in the partial pressures of the components. By reducing both the temperature and partial pressures of the components, the infrared radiation emitted by the components will be reduced.

The reduction of the temperature of the exhaust stream and the partial pressures of the radiation emitting gaseous components is time dependent and cannot be accomplished instantaneously. However, the shortest distance between the center of the gas stream and its outer envelope can be altered almost instantaneously. This, then, is the best means of rapidly reducing the emissivity of the stream.

The shortest distance between the center of the gas stream and its outer envelope is reduced in accord with the invention by breaking up the stream into a plurality of smaller streams, by altering the shape of the exhaust gas stream, or by both breaking up the stream and also controlling the shapes of the resulting smaller streams. This provides a rapid and controllable reduction in the radiation emitted by the exhaust gases to shield the gases from detection by a heat-seeking missile. In addition, the reduction of the shortest distance between the center of the gas stream and its outer envelope promotes diffusion of the gas stream to reduce its temperature and the partial pressures of the radiation-emitting gaseous components. This also promotes reduction of the infrared radiation from the exhaust gases.

Figure 10:
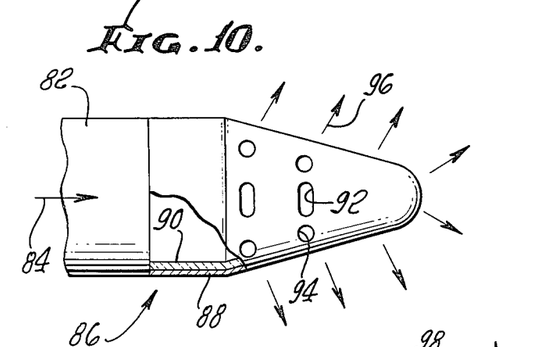
FIG. 10 is a front view illustrating an insulated diffusion device having an ocarina configuration placed in the exhaust opening from an engine with a plurality of openings, some circular and some elliptical, in the diffusion device for discharging smaller streams of exhaust gas from the device.

FIG. 10 illustrates an insulated diffusion device 86 placed in the opening from an exhaust pipe 82 with the main stream of exhaust gases 84 being transmitted to the diffusion device. The diffusion device 86, which is illustrated as having an ocarina configuration, is composed of a wall 88 having insulation 90 thereon to maintain the exterior surface of the diffusion device at a relatively low temperature which does not emit a significant level of infrared radiation. A plurality of openings are provided in the diffusion device 86 and are illustrated as elliptical openings 92 and circular openings 94. These openings break up the main exhaust stream 84 into a plurality of smaller exhaust streams 96 which may be randomly positioned with respect to each other such that a region of high temperature in one of the smaller streams does not reinforce the infrared signal provided by a region of higher temperature in one of the other smaller streams. To provide random orientation of the smaller streams 96, both the location and shape of various openings in the diffusion device may be varied.

Figure 11:
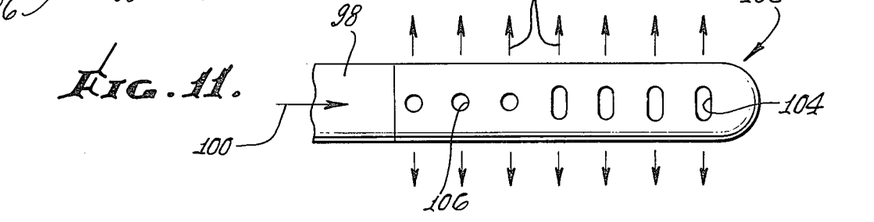
FIG. 11 is a front view, similar to FIG. 10, illustrating a diffusion device having a flute configuration in the exhaust opening from an engine.

In an alternative diffusion device, shown in FIG. 11, the diffusion device 102 has a flute configuration and is attached to the exit end of an exhaust pipe 98 to receive an main exhaust gas stream 100. A plurality of openings in the diffusion device 102 may take the form of elliptical openings 104 and circular openings 106 with a plurality of smaller exhaust gas streams 108 being emitted through the openings to promote the diffusion of heat and energy from the exhaust gases.

Figure 12:
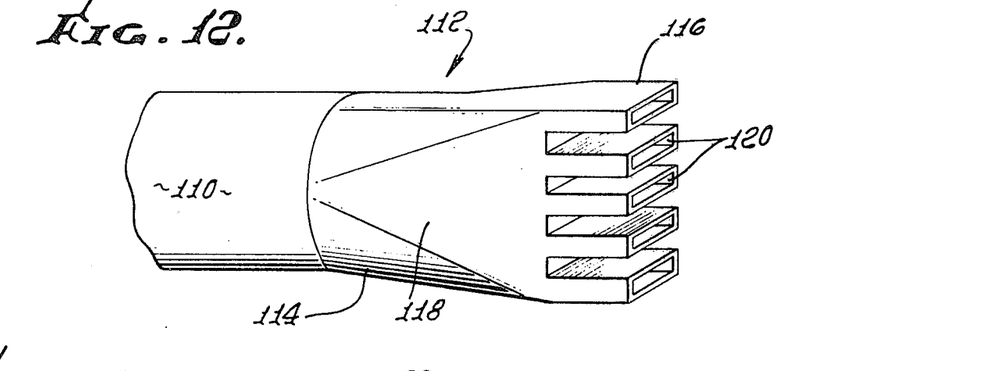
FIG. 12 is a front view, similar to FIG. 10, illustrating a diffusion device in the exhaust opening from an engine which has a marimba configuration.

In a further embodiment of a diffusion device, shown in FIG. 12, the diffusion device 112 has a marimba configuration and is attached to the discharge end of an exhaust pipe 110. The exhaust device 112 includes a circular portion 114, a generally rectangular portion 116, and a transition portion 118 interconnecting the circular and rectangular portions. Leading from the rectangular portion 116 are a plurality of rectangular openings 120 which are each designed to produce a shape in the emitted exhaust gas streams that promotes diffusion of heat and energy from the emitted streams.

Figure 13:
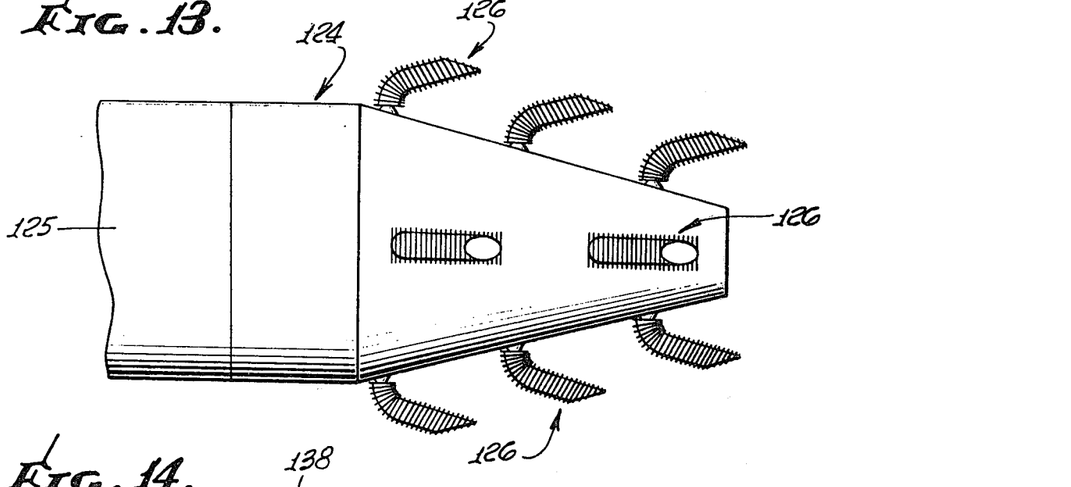
FIG. 13 is a front view, similar to FIG. 10, illustrating a diffusion device in the exhaust opening from an engine with the diffusion device having an ocarina configuration and a plurality of exhaust gas conducting members positioned to receive smaller streams of exhaust gas from the diffusion device.

In the embodiment shown in FIG. 13, a diffusion device 124 having an ocarina configuration is attached to the discharge end of an exhaust pipe 125 with a plurality of exhaust ducts 126 positioned about the diffusion device. The exhaust ducts 126 receive the smaller streams of exhaust gases and shield the interior surfaces of the diffusion device from view through any of the openings in the device. The structural configuration of the exhaust ducts 126, as illustrated in detail in FIG. 14, may be similar to that of the exhaust duct 12 as described with reference to FIGS. 1–5.

Figure 14:
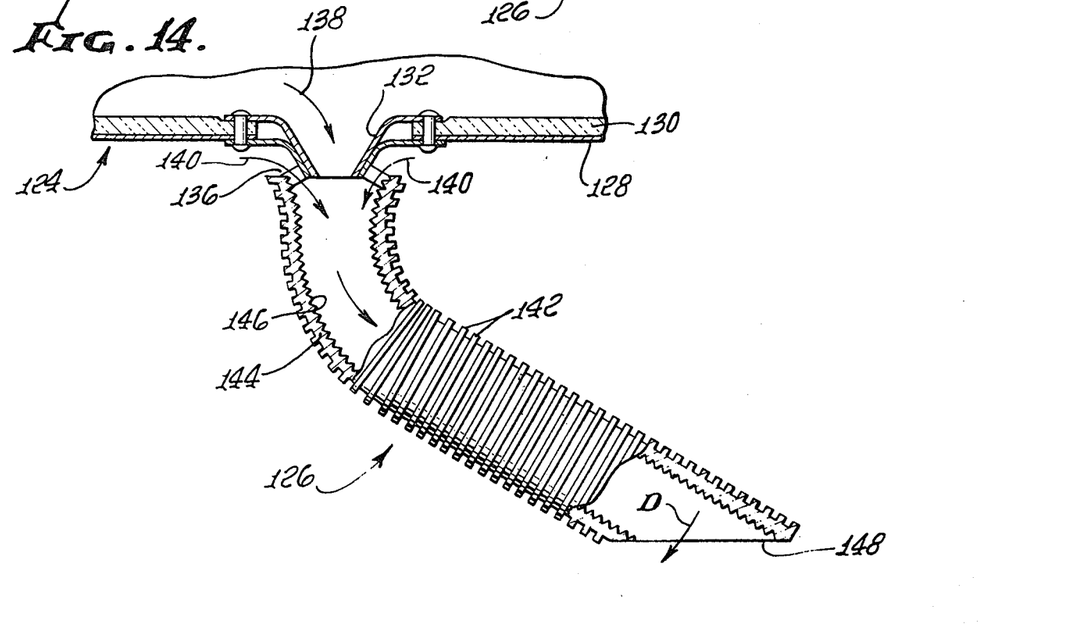
FIG. 14 is an enlarged side sectional view illustrating the structure of one of the exhaust gas conducting members employed in the structure of FIG. 13, and illustrating the manner in which the exhaust gas conducting member is connected to the diffusion device.

The diffusion device 124 includes an outer shell 128, which may be made of metal, and has a coating of insulation 130. An exhaust gas port 132 in the wall of the device 124 permits the exit of a smaller exhaust gas stream 138 through the port into the exhaust duct 126. The exhaust duct 126 may be supported in spaced relation to the diffusion device 124 to provide an opening 136 for the entrance of cooling air 140 as a boundary layer adjacent the interior surface of the duct. As described previously, it is desirable that the surfaces of the exhaust duct 126 be at a relatively low temperature to not emit any significant level of infrared radiation.

To provide cool duct surfaces, the interior surface of the exhaust duct 126 may include threads, serrations or slots, etc., as indicated by reference numeral 146, with the wall 144 being formed of a metal high heat conductivity. Fins 142 are provided on the exterior surface of the duct 126 to increase the heat transfer area on the exterior surface. Thus, the transfer of heat into the duct 126 across its interior surface is inhibited while the removal of heat from the duct is promoted through the high heat conductivity of the wall 144 and the large area for heat transfer at the exterior surface of the duct. This provides a duct 126 whose surfaces are relatively cool and do not emit any significant level of infrared radiation. As illustrated, the exterior opening from the duct 126 may be cut on a bias as illustrated at 148 which promotes diffusion of the gas in the direction of the arrow D. This tends to prevent impingement of emitted exhaust gas on either the exterior surface of the diffusion device 124 or on the exterior surfaces of adjacent exhaust ducts 126.

Figure 15:
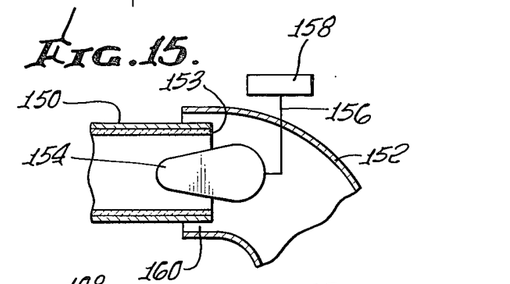
FIG. 15 is a schematic partial front view of an exhaust gas conducting member in conjunction with an exhaust opening having means to vary the velocity of exhaust gases fed to the conducting member in controlling the amount of cool air introduced into the gas conducting member.

FIG. 15 illustrates in a partial schematic front view a means of varying the amount of air introduced into a gas conducting member to dilute and cool the exhaust gases within the member. An engine exhaust 150, which is insulated, conveys exhaust gas to an exhaust duct 152 which may have the general configuration of the exhaust duct 12 as described in regard to FIGS. 1–5. The exhaust duct 152 is supported in spaced relation to the engine exhaust 150 to provide an annular opening 160 for the introduction of a boundary layer of cooling air adjacent the interior surface of the duct at its inlet. The amount of cooling air introduced through opening 160 is dependent on the velocity of the exhaust gases passing through the duct 152. To vary the velocity of the exhaust gases and, thus, the amount of cooling air introduced through the opening 160, means are provided in the engine exhaust 150 to vary the size of the discharge end 153 from the engine exhaust. The means for varying the size of the discharge end 153, which may take any of several forms, is illustrated as a plug 154 actuated through a linkage 156 from a suitable control 158. The use of plugs and other devices for the throttling of gases by constricting the opening through which the gas flows is well known. Thus, the plug 154 and its control linkage, etc., are only illustrated in schematic form.

As illustrated, when the plug 154 is advanced into the engine exhaust 150, the size of the discharge end 153 is reduced. This creates a back pressure on the engine (not shown) which reduces its power output. Also, it increases the velocity of the exhaust gases passing through the discharge end 153 which, in turn, increases the flow rate of cooling air through the annular opening 160. This provides a greater dilution of the exhaust gases with the cooling air to reduce infrared radiation from the gases.

As the plug 154 is withdrawn from the engine exhaust 150, the discharge end 153 is increased in size. This reduces the back pressure on the engine and its power output is increased. Also, however, the velocity of the exhaust gases passing through the discharge end 153 is reduced and the flow of cooling air through the opening 160 is reduced. The exhaust gases are, thus, diluted with a lesser quantity of cooling air, are not cooled as rapidly, and emit more infrared radiation.

By providing a means to control the velocity of the exhaust gases, as in FIG. 15, the pilot of an aircraaft is given various options depending on his operational situation. If the aircraft is under ground fire and maximum speed is required, the pilot can enlarge the exhaust gas opening to its fullest extent to provide maximum power with increased radiation from the exhaust gases. However, if maximum shielding of the engine exhaust gases is needed to prevent detection, the exhaust gas opening can be constricted to its maximum extent to decrease power output from the engine while maximizing dilution and cooling of the exhaust gases.

As described previously, the exhaust gas conducting member may have an exterior surface configuration which promotes the rejection of heat from the exterior surface. Although fins may be employed on the exterior surface, other surface configurations are preferable which permit contact of the heat rejection areas of the surface with cooling air irrespective of the directional movement of the air with respect to the surface.

Figure 16:
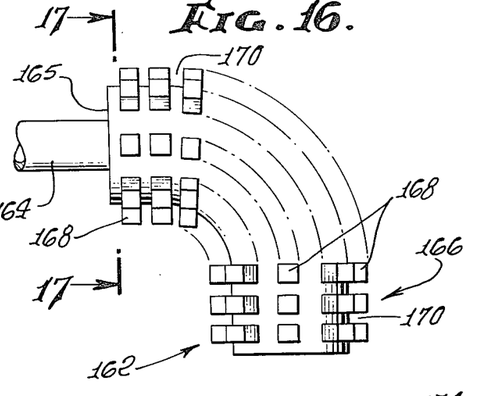
FIG. 16 is a partial front view of an exhaust gas conducting member having a plurality of posts positioned on its exterior surface to increase the available area for heat rejection from the exterior surface.

An exterior surface configuration which may be utilized to increase heat rejection is illustrated in FIG. 16. An exhaust duct 162 may be connected to an insulated engine exhaust 164 in a manner similar to that described previously to maintain the exhaust duct and engine exhaust in spaced relation to provide an annular opening 165 for introduction of a boundary layer of cooling air adjacent the interior surface of the exhaust duct. The exhaust duct 162 includes an exterior surface 166 having a plurality of upright posts 168 thereon. As illustrated, the upright posts 168 may have a generally rectangular cross-sectional configuration with the posts being separated by transverse openings 170.

Figure 17:
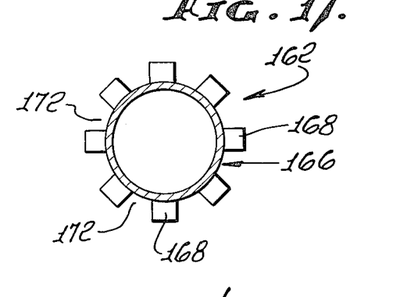
FIG. 17 is a sectional view taken along the line 17—17 of FIG. 16 to illustrate the positioning of the posts about the peripheral surface of the exhaust gas conducting member.

In FIG. 17, which is a sectional view taken along the line 17—17 of FIG. 16, the upright posts 168 are shown as being separated by longitudinal openings 172. The transverse openings 170 and longitudinal openings 172 permit the flow of cooling air into contact with the heat rejection areas on the exterior surface 166 irrespective of the directional movement of the air with respect to the exterior surface. Thus, for example, when the exhaust duct 162 is positioned over an aircraft exhaust 164, efficient heat rejection is provided from the exterior surface 166 irrespective of the position of the duct with respect to the aircraft or the direction of movement of the aircraft.

The upright posts 168 on the exterior surface 166 may be formed in any convenient manner, such as by casting to form a metallic sheet with posts positioned on one surface and the sheet then being shaped to form an exhaust duct of any desired cross-sectional configuration such as circular, square, elliptical, etc. Also, upright posts, such as the posts 168, may be formed by a machining operation, such as milling.

Figure 18:
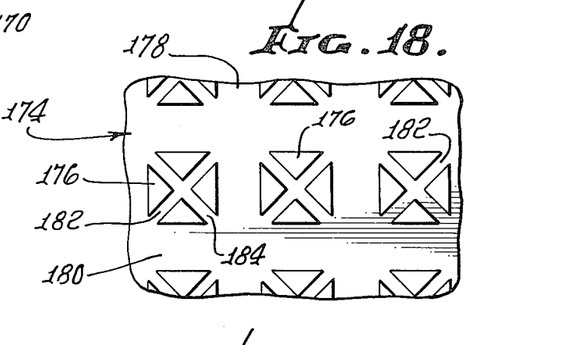
FIG. 18 is a plan view of a portion of the exterior surface of an exhaust gas conducting member to illustrate another embodiment of means to reject heat from the exterior surface in which a plurality of posts having a triangular cross sectional configuration are positioned on the surface.

A further means of providing efficient heat rejection at the exterior surface of an exhaust gas conducting member is illustrated in FIG. 18 which is an enlarged partial plan view of an exterior duct surface 174. Positioned on the exterior surface 174 are upright posts 176 having a triangular cross-sectional configuration. The upright posts 176 are separated by transverse openings 178, longitudinal openings 180 and diagonal openings 182 and 184. While the posts 176 may be formed in any desired manner, the posts may be visualized as being formed from the posts 168 described with regard to FIGS. 16 and 17. The posts 176 may, thus, be formed by removing metal from the posts 168 to form the slots 182 and 184 which then divide the posts 168 along diagonal directions. This operation may be performed, for example, by milling.

The surface configuration illustrated in FIG. 18 permits the movement of cooling air into contact with the heat rejection areas of the surface 174 along a number of paths. The cooling air may flow through the transverse openings 178, the longitudinal openings 180, the diagonal openings 182 and 184 or any combination of these openings. This provides effective heat rejection at the exterior surface 174 irrespective of the directional movement of the cooling air with respect to the exterior surface.

Figures 19, 20:
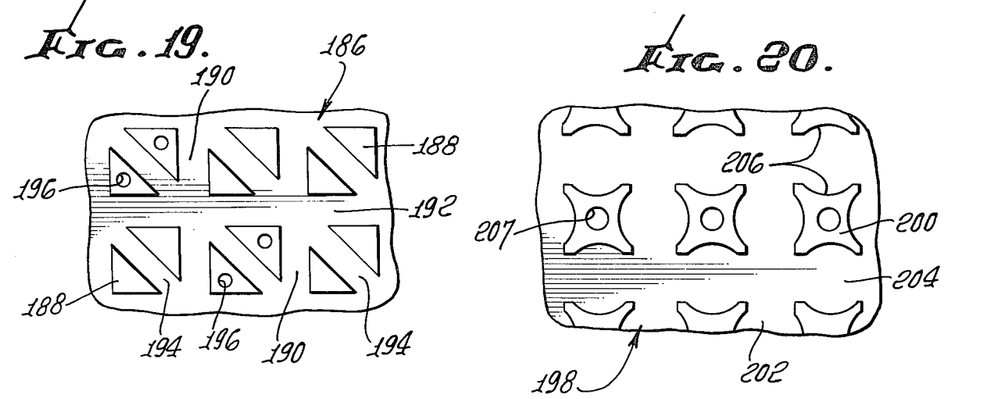
FIG. 19 is a plan view, similar to FIG. 18, illustrating a further exterior surface configuration of the exhaust gas conducting member.
FIG. 20 is a plan view, similar to FIG. 18, in which posts formed on the exterior surface of the exhaust gas conducting member having a modified cruciform cross sectional configuration.

FIG. 19, which is a plan view of an exterior duct surface similar to FIG. 18, illustrates another embodiment in which an exterior surface 186 includes a plurality of upright posts 188 which each have a triangular cross-sectional configuration. The upright posts 188 are separated by a plurality of transverse openings 190 as well as a plurality of longitudinal openings 192. In addition, each of the upright posts 188 is separated from its adjacent post by a diagonal opening 194. To further increase the available area for heat rejection, holes 196 may be formed in the upright posts 188. The upright posts 188 may be formed in any desired manner such as, for example, by machining the posts 168 described in FIGS. 16 and 17 through removal of metal to form the diagonal openings 194 and the holes 196.

Still another embodiment of an exterior surface for effective heat rejection is illustrated in FIG. 20 which is a plan view similar to FIGS. 18 and 19. As illustrated, an exterior surface 198 includes a plurality of upright posts 200 having a generally cruciform cross-sectional configuration. The posts 200 are separated by a plurality of transverse openings 202 and a plurality of longitudinal openings 204 to permit the movement of cooling air into contact with the heat rejection areas of the surface 198. In forming the posts 200, the posts 168 of FIGS. 16 and 17 may be machined to form curved surfaces 206 with holes 207 being drilled to further increase the area for heat rejection.

Figure 21:
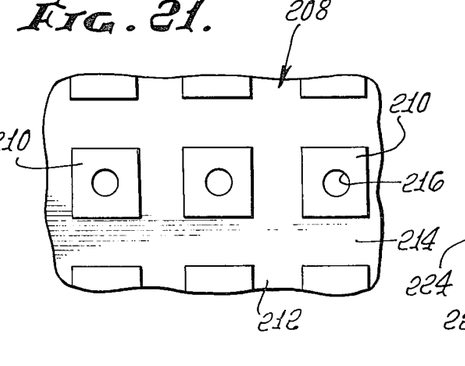
FIG. 21 is a plan view, similiar to FIG. 18, of posts having a square configuration.

FIG. 21, which is a plan view similar to FIGS. 18–20, illustrates an exterior heat rejection surface 208 having a plurality of upright posts 210 with the posts being separated by a plurality of transverse openings 212 and a plurality of longitudinal openings 214. Holes 216 may be provided in the posts 210 to increase the available heat rejection area.

The holes described in regard to FIGS. 19–21 may be positioned in any desired manner with respect to the posts to increase the available area for heat rejection. Thus, the holes may be formed at the end surfaces of the posts or through their side surfaces and a plurality of holes may be formed in individual posts. Additionally, the interior openings formed in the posts need not be circular but may take other configurations such as square, hexagonal, etc. Interior openings which are circular are more easily formed by standard machining operations such as drilling than are openings having other configurations, such as hexagonal. It is for this reason that the internal openings in the posts are illustrated as circular.

Figure 22:
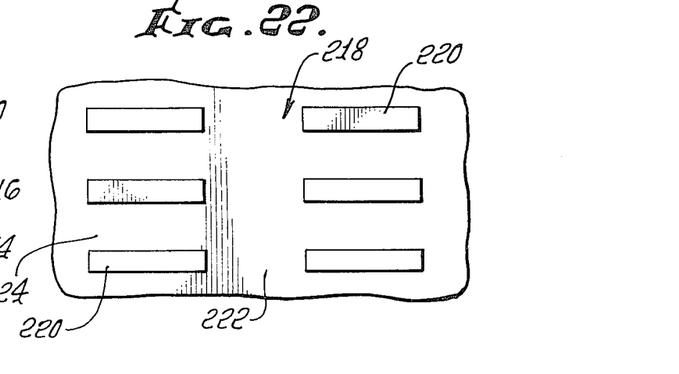
FIG. 22 is a plan view, similar to FIG. 18, of posts having an elongated rectangular configuration.

FIG. 22 illustrates still another embodiment of a surface for providing efficient heat rejection in which an exterior surface 218 includes upright posts 20 having an elongated rectangular cross-sectional configuration. The posts 220 are separated by transverse openings 222 and longitudinal openings 224 to permit the flow of cooling air relative to the heat rejection areas of the surface 218.

Due to the configuration of the posts 220, the exterior surface 218 may provide more efficient heat rejection when the direction of air movement is generally in the direction of the longitudinal openings 224. Thus, if the surface 218 were utilized as the exterior surface of an exhaust gas conducting member positioned with respect to an aircraft, the longitudinal openings 224 would preferably be aligned with the general direction of forward movement of the aircraft.

Figure 23:
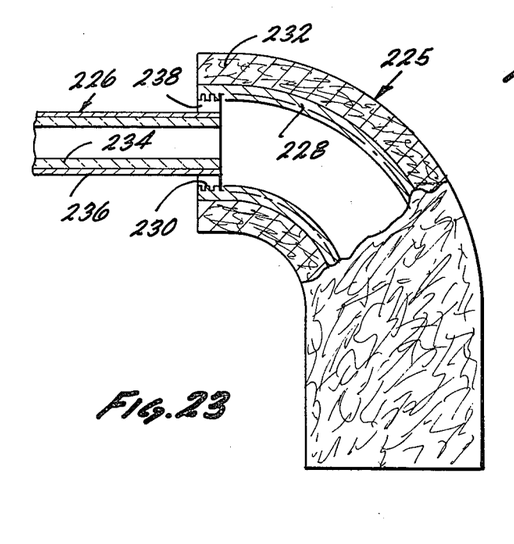
FIG. 23 is a side view in partial section of an exhaust gas conducting member having a reticulated metal foam positioned on its exterior surface for the removal of heat therefrom.

Turning to FIG. 23, there is illustrated an exhaust duct 225 which is connected to an engine exhaust 226 in a manner similar to the construction shown in FIG. 2. The exhaust duct 225 includes a duct wall 228 having a plurality of serrations or slots 230 positioned on the interior surface thereof and a reticulated metal foam 232 positioned on the exterior surface of the duct wall 228. The engine exhaust 226 includes a pipe 234 having insulation 236 on its exterior surface and an annular opening 238 for the admission of cooling air into the exhaust duct 224.

Figure 24:
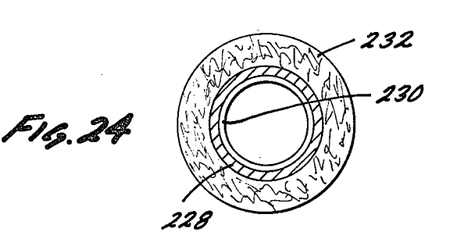
FIG. 24 is a transverse sectional view through the exhaust gas conducting member of FIG. 23.
Figure 25:
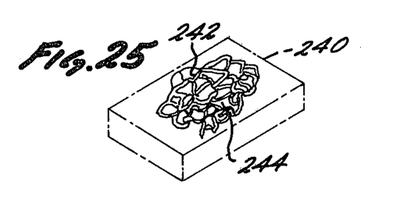
FIG. 25 is a detailed view of a portion of the reticulated metal foam which is positioned on the exterior of the exhaust gas conducting member of FIG. 23.

FIG. 24, which is a transverse sectional view through exhaust duct 225 of FIG. 23, illustrates the positioning of the reticulated metal foam 232 on the exterior surface of the duct wall 228. The structure of the reticulated metal foam is illustrated in FIG. 25. As shown, a piece of metal foam 240 includes a plurality of randomly positioned metal elements which are interconnected to form a rigid structure. Openings 244 pass before the various metal elements 242 with the openings being randomly positioned throughout the structure of the metal foam to form an open-pored structure having a large surface area for the transfer of heat. The term reticulated refers to a material in which membranes between the foam cell strands are removed to leave a skeletal strand structure. The reticulated metal foam can be made from a variety of metals such as aluminum, steel, nickle-chrome alloy, copper, beryllium, lead or zinc. Reticulated metal foams of various sizes may be employed such as 5, 10, 40 or 80 pores per lineal inch (ppi) and a supplier of reticulated metal foam is Energy Research Generation, Inc., 952 – 57th Street, Oakland, Calif. 74608.

As has been demonstrated in actual test results, the use of a reticulated metal foam on the exterior surface of the gas conducting member 225 is a very efficient way of transferring heat from the exhaust duct. By rapidly removing heat from the surface of the exhaust duct 225, as described previously, any heat which is transferred from the exhaust gases into the duct wall 228, which is formed of a high conductivity metal, is rapidly removed by conduction through the wall to the reticulated metal foam 232 which efficiently transfers the heat to the air which contacts the large surface area provided by the reticulated metal foam.

Figure 26:
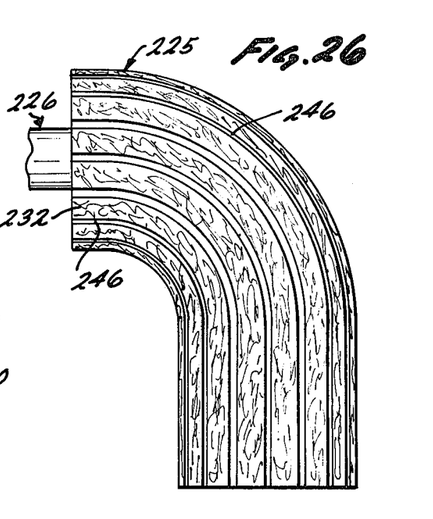
FIG. 26 is a side view of an exhaust conducting member, similar to that of FIG. 23, in which axial grooves have been formed in the reticulated metal foam on the exterior surface of the gas conducting member so as to increase the exposed surface area in the removal of heat.

As illustrated in FIG. 26, which is a side view of an exhaust gas conducting member 225, similar to FIG.

23, the reticulated metal foam 232 may have a plurality of axial slots 246 formed therein. The function of the axial slots 246 is to increase the surface area provided by the reticulated metal foam 232 and to, thereby, increase the rate of heat transfer from the exterior surface of the exhaust duct 224 to the air.

Figure 27:
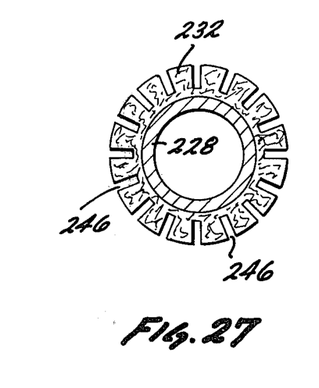
FIG. 27 is a transverse sectional view through the exhaust gas conducting member of FIG. 26.

FIG. 27, which is a transverse sectional view through the exhaust duct of FIG. 26, illustrates the positioning of the reticulated metal foam 232 on the exterior surface of the duct wall 228 with the plurality of axial slots 246 formed in the reticulated metal foam.

Figure 28:
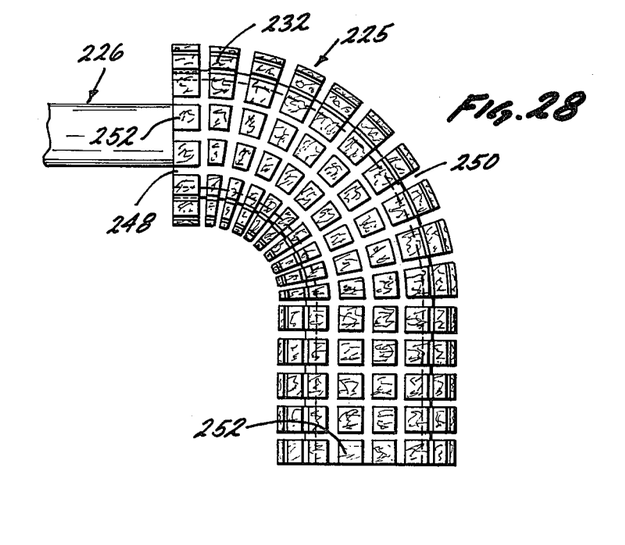
FIG. 28 is a side view, similar to FIG. 23, of an exhaust gas conducting member having a reticulated metal foam on its exterior surface and having both longitudinal and transverse slots formed in the metal foam so as to increase the surface area and to promote the removal of heat from the surface area.

FIG. 28 is a side view of an exhaust gas conducting member 225, similar to FIG. 23, in which both axial slots 248 and transverse slots 250 are formed in the reticulated metal foam 232. Through use of both axial slots 248 and transverse slots 250, the surface on the exterior of the exhaust duct 224 may be divided into a plurality of posts 252 formed of the reticulated metal foam 232.

Figure 29:
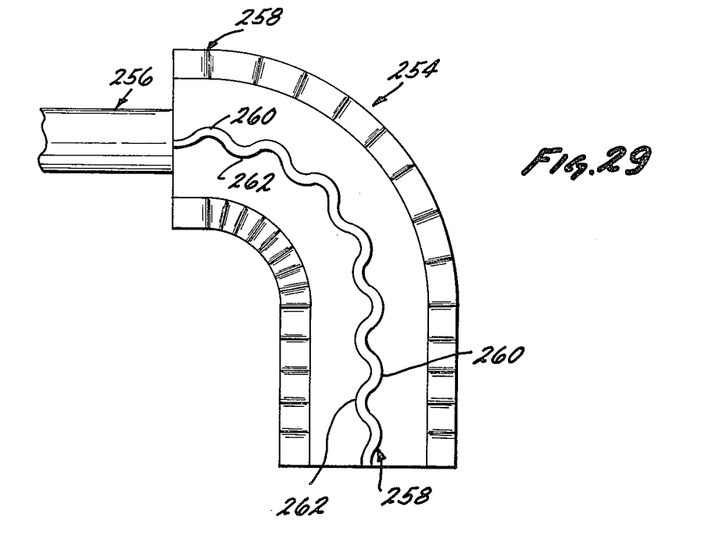
FIG. 29 is a partial side view of a gas conducting member having undulating fins positioned along the longitudinal axis of the member of the removal of heat from the exterior surface of the member.

FIG. 29 is a partial side view of an exhaust duct 254 connected to an engine exhaust 256 in the same manner as described in regard to FIG. 2. A plurality of closely spaced undulating fins 258 are placed on the exterior surface of the exhaust duct 254 with the fins positioned along the axis of the exhaust duct. For purposes of illustration, only a few of the fins 258 are shown on the exterior surface of duct 254. The undulating fins 258 may have any type of undulating configuration but are illustrated as having a generally sinusoidal configuration when viewed in plan to form alternate crests 260 and troughs or valleys 262.

Figure 30:
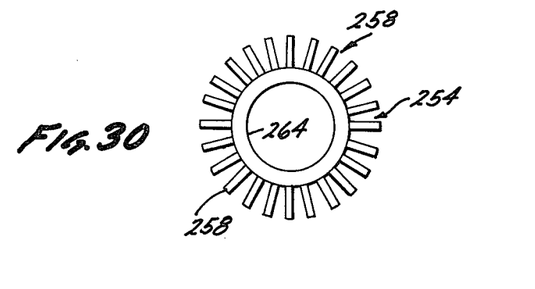
FIG. 30 is a transverse sectional view of the gas conducting member of FIG. 29.

As illustrated in FIG. 30, which is a transverse sectional view through duct 254 of FIG. 29, the undulating fins 258 may be positioned in a uniform radial manner about the duct wall 264 with the crests 260 and troughs 262 of adjacent fins being in alignment. It has been found through actual testing that the use of undulating fins, such as fins 258, is a very efficient means of removing heat from the exterior surface of the exhaust duct 254 so as to maintain the various surfaces of the duct, both interior and exterior, at a relatively low temperature and to prevent the emission of any significant level of infrared radiation from the duct surfaces.

Figure 31:
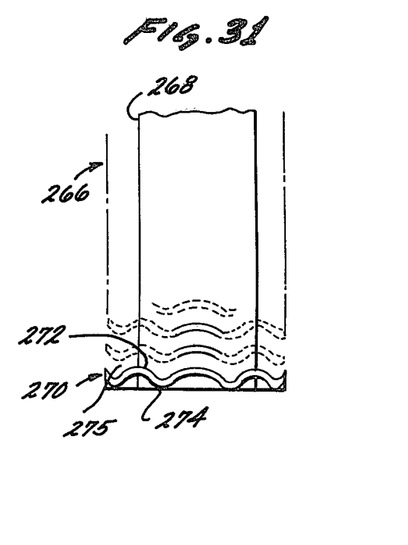
FIG. 31 is a partial side view of a gas conducting member having a plurality of undulating fins positioned on its exterior surface with the undulating fins positioned in a generally transverse direction with respect to the axis of the gas conducting member.

Turning to FIG. 31, there is illustrated a portion of an exhaust duct, indicated as 266, having a duct wall 268 with a plurality of undulating fins 270 positioned on the exterior of the duct and positioned transversely with respect to the axis of the exhaust duct. As illustrated, the undulating fins 270 are positioned in a spaced-apart relation with each of the fins having a generally sinusoidal configuration with alternating crests 272 and troughs or valleys 274. In usage, cooling air flows through the spaces 275 which are formed between adjacent fins 270.

Figure 32:
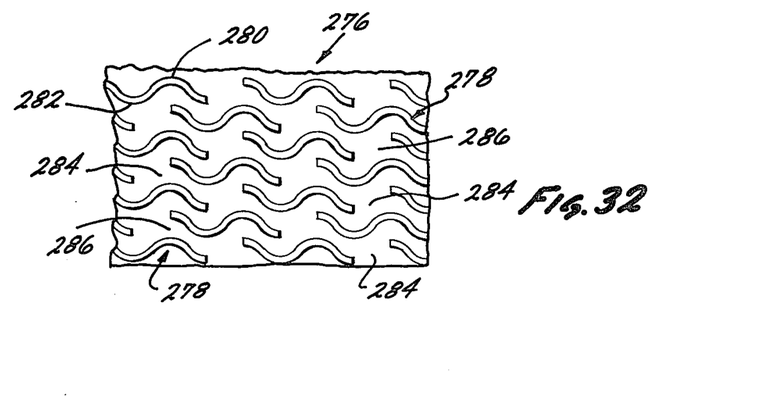
FIG. 32 is a detail plan view of a portion of the exterior surface of a gas conducting member in which a plurality of undulating fins are positioned on the exterior surface with staggered openings formed through the fins to provide a tortuous path for air movement relative to the fins.

If desired, as shown in FIG. 32, the exterior surface of the exhaust duct, which is illustrated by an exhaust duct portion 276, may include a plurality of undulating fins 278 positioned thereon with each of the fins having alternate crests 280 and troughs or valleys 282. The undulating fins 278 may be formed in aligned relation such that the crests 280 and troughs 282 of adjacent fins are in alignment. Further, to increase the flow of air past the undulating fins 278, a plurality of staggered openings 284 may be formed through the fins. The staggered openings 284 coupled with openings 286 between the fins provide a tortuous air flow path in promoting heat transfer from the exterior surface of the exhaust duct portion 276.

Figure 33:
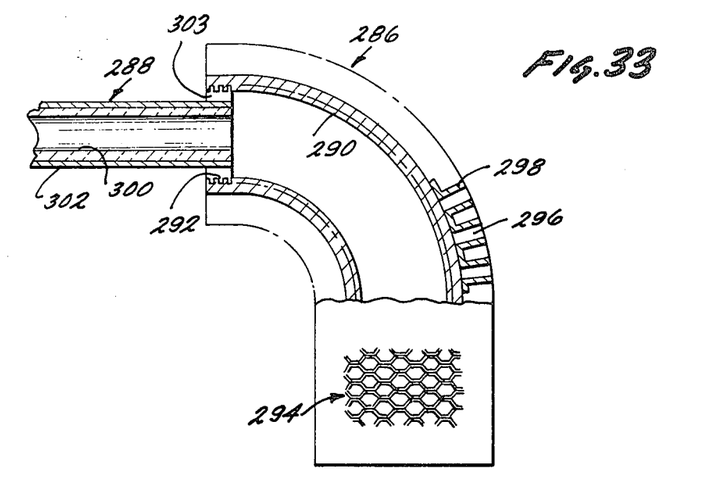
FIG. 33 is a side view in partial section of an exhaust gas conducting member having a honeycomb structure positioned on its exterior surface for the removal of heat therefrom.

In another embodiment of the invention, as shown in FIG. 33, an exhaust duct 286 may be connected to an engine exhaust 288 in a manner similar to the construction shown in FIG. 2. The exhaust duct 286 includes a duct wall 290 with a plurality of serrations or slots 292 positioned on the interior surface of the duct wall. A honeycomb structure indicated generally as 294 may be positioned on the exterior surface of the duct wall 290 so as to assist in the removal of heat from the exterior surface. As shown, the honeycomb structure 294 is made up of a plurality of cells 296 with the cells being defined by a plurality of upstanding walls 298.

The engine exhaust 288 includes a pipe 300 having an insulative layer 302 on its exterior surface. In connecting the exhaust duct 286 to the engine exhaust 288, an annular opening 303 may be provided so as to admit cooling air into the interior of the exhaust duct 286 in the manner described previously.

Figure 34:
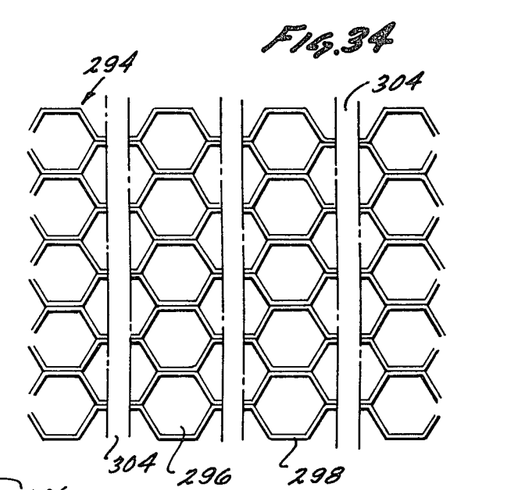
FIG. 34 is a plan view of a portion of a honeycomb structure of the type shown in FIG. 33 in which longitudinal slots have been formed through the cells of the honeycomb structure.

Turning to FIG. 34, which is an enlarged plan view of a portion of a honeycomb structure 294 of the type shown in FIG. 33, the cells 296 of the honeycomb structure may be intersected by slots 304 which are positioned axially or longitudinally with respect to the exhaust duct 286. With the inclusion of longitudinal slots 304, the airflow relative to the honeycomb structure 294 may be assisted by the slots to increase the heat transfer between the honeycomb structure 294 and the air.

Figure 35:
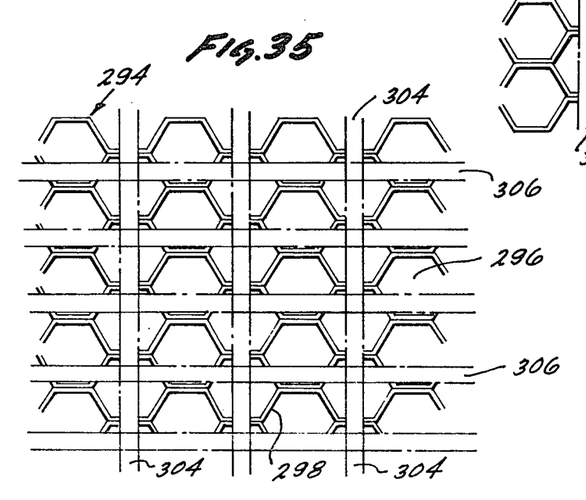
FIG. 35 is a plan view of a honeycomb structure, similar to FIG. 34 in which both longitudinal and transverse slots have been formed through the cells of the honeycomb structure.

In FIG. 35, which is an enlarged plan view similar to FIG. 34, the honeycomb structure 294 is illustrated as having both longitudinal or axial slots 304 and also transverse slots 306 which pass through the cells 296 of the honeycomb structure. Through the use of both longitudinal or axial slots 304 and also transverse slots 306, the airflow relative to the honeycomb structure 294 may be further assisted to increase heat transfer between the honeycomb structure and the air.

1. A device for shielding a heated surface from infrared detection through an opening adjacent the heated surface comprising:
   a gas conducting member adapted to receive heated gases from the opening;
   said member being formed of a material which has a high heat conductivity;
   said member having an interior surface and an exterior surface separated by a wall, an inlet for receipt of heated gases and an outlet for discharge of heated gases;
   said member having a configuration which blocks said inlet from line-of-sight view through said outlet;
   said interior surface having a configuration which shields a portion of said interior surface against contact with heated gases passing through said member, and
   means to promote heat transfer through said wall from said interior surface to said exterior surface, whereby heat transfer from the heated gases to said interior surface is reduced by the lack of contact between the heated gases and said shielded portions of the interior surface while heat received by the member at said interior surface is rapidly removed from the member by said second means to maintain said member at a relatively low temperature with respect to the temperature of said heated gases.

2. The device of claim 1 including indentations in said interior surface to form recessed pockets therein;

said indentations having a width which is sufficiently small to impede the entrance of heated gases into said pockets, whereby the available heat transfer area on said interior surface is reduced in relation to the area removed from the interior surface by said indentations.

3. The device of claim 2 wherein said indentations are slots in said interior surface.

4. The device of claim 2 wherein said indentations are convolutions in said interior surface.

5. The device of claim 2 wherein said indentations are serrations in said interior surface.

6. The device of claim 1 wherein said gas conducting member has an elbow configuration.

7. The device of claim 1 wherein said gas conducting member is formed of a metal which has high heat conductivity.

8. The device of claim 1 including
an annular opening in said member for introducing an annulus of cool air as a boundary layer adjacent the inner surface of said member.

9. The device of claim 1 including
means on said exterior surface to increase heat rejection from the exterior surface.

10. The device of claim 9 including
fins on said exterior surface.

11. The device of claim 10 wherein said fins have an undulating configuration.

12. The device of claim 11 including openings formed through said fins.

13. The device of claim 9 including a reticulated metal foam on said exterior surface.

14. The device of claim 13 wherein said metal form has a thickness of about ⅛ to about one inch.

15. The device of claim 13 wherein said metal foam has from about 5 to about 80 pores per inch.

16. The device of claim 13 wherein said foam is formed from stainless steel.

17. The device of claim 9 including a honeycomb structure on said exterior surface.

18. The device of claim 17 wherein said honeycomb structure is slotted.

19. The device of claim 18 wherein the slots in said honeycomb structure are positioned longitudinally with respect to said gas conducting member.

20. The device of claim 18 wherein the slots in said honeycomb structure are positioned both longitudinally and transversely with respect to said gas conducting member.

21. The device of claim 1 including
diffusion means positioned to break up the stream of exhaust gas into a plurality of smaller streams.

22. The device of claim 1 including
means on said exhaust gas conducting member to change the shape of the exhaust gas stream to a shape having a reduced emissivity.

23. The device of claim 22 including means to change the cross sectional configuration of the exhaust gas stream to an elongated elliptical or rectangular configuration.

24. The device of claim 1 including
diffusion means positioned to break up the stream of exhaust gas into a plurality of smaller streams and to provide the smaller streams with a shape having a reduced emissivity.

25. The device of claim 24 wherein said smaller streams are randomly positioned with respect to each other such that one stream blocks another from view and a region of higher temperature in one smaller stream does not tend to reinforce the infrared signal provided by a region of higher temperature in another smaller stream.

26. The device of claim 1 including
means to introduce a boundary layer of a cooling gas adjacent the interior surface of said member.

27. The device of claim 2 wherein said indentations are formed by a thread in said interior surface.

28. The device of claim 26 including
means to vary the quantity of cooling gas introduced into said member.

29. The device of claim 28 wherein the quantity of cooling gas is varied by varying the velocity of the heated gas within the gas conducting member.

30. The device of claim 9 including
a plurality of posts positioned on said exterior surface, and
openings between said posts to permit the flow of air with respect to the surfaces of the posts irrespective of the direction of relative movement of the said device and the cooling air.

31. The device of claim 30 wherein said posts have a rectangular cross sectional configuration.

32. The device of claim 31 wherein said posts have a substantially square cross sectional configuration.

33. The device of claim 31 wherein said posts have an elongated rectangular cross sectional configuration.

34. The device of claim 30 wherein said posts have a triangular cross sectional configuration.

35. The device of claim 30 wherein said posts have a generally cruciform cross sectional configuration.

36. The device of claim 30 wherein said openings are positioned in both a longitudinal and a transverse direction with respect to said device.

37. The device of claim 30 including openings between said posts positioned in a diagonal direction with respect to said device.

38. The device of claim 30 wherein
said posts are positioned on the exterior surface in groups, and including
openings positioned in both a longitudinal and a transverse direction with respect to said device;
said openings separating said groups of posts, and
openings positioned diagonally with respect to said device with the diagonal openings separating the individual posts from other posts in its groups.

39. The device of claim 38 wherein each group contains two posts, and
the two posts in each group are separated by one diagonal opening.

40. The device of claim 38 wherein
each group contains four posts, and
the four posts in each group are separated by two intersecting diagonal openings.

41. The device of claim 30 including
openings in said posts to define internal surfaces therein.

42. The device of claim 41 wherein the openings in the posts are substantially circular.

43. A diffusion device for breaking a main stream of a heated exhaust gas into a plurality of smaller streams which have a lower emissivity than the main stream of exhaust gas comprising:

a body adapted to receive a main stream of heated exhaust gas;

insulation means on said body to maintain the exterior surface of said body at a relatively low temperature with respect to the temperature of the heated exhaust gas;

a plurality of openings in said body for discharge of smaller streams of exhaust gas from said body;

exhaust gas conducting members positioned to receive the smaller streams of exhaust gas from said openings;

said exhaust gas conducting members having a configuration which blocks said openings from line-of-sight view;

said members being formed of a material having high heat conductivity with each of said members having an interior surface and an exterior surface separated by a wall, an inlet for receipt of heated exhaust gas and an outlet for discharge of heated exhaust gas;

said interior surface having a configuration which shields a portion of said interior surface against contact with heated exhaust gas passing through said member, and means to promote heat transfer through said wall from said interior surface to said exterior surface, whereby heat transfer from the heated exhaust gas to the interior surfaces of said members is reduced by the lack of contact between the heated gas and said shielded portions of the interior surfaces while heat received by the members at said interior surfaces is rapidly removed from said members by said second means to maintain the members at a relatively low temperature with respect to the temperature of the heated exhaust gas.

44. The diffusion device of claim 43 wherein said body has an ocarina configuration.

45. The diffusion device of claim 43 wherein said body has a flute configuration.

46. The diffusion device of claim 43 wherein said body has a marimba configuration.

47. The diffusion device of claim 43 including
means on said exhaust gas conducting members to provide the smaller stream of exhaust gas with a shape which reduces the emissivity of said smaller streams.

48. The diffusion device of claim 47 wherein the smaller streams of exhaust gases are provided with a generally rectangular or elliptical cross sectional configuration.

49. The diffusion device of claim 43 wherein the exhaust gas conducting members are shaped to prevent impingement of the smaller streams of exhaust gas against the exterior surface of said body or against the exterior surface of an adjacent exhaust gas conducting member.

50. The diffusion device of claim 43 wherein the smaller streams are randomly positioned such that one stream blocks another from view and a region of higher temperature in one smaller stream does not tend to reinforce the infrared signal provided by a region of higher temperature in another smaller stream.

51. The diffusion device of claim 43 including
indentations in said interior surface to form recessed pockets therein;

said indentations having a width which is sufficiently small to impede the entrance of heated exhaust gas into said pockets, whereby the available heat transfer area on said interior surface is reduced in relation to the area removed from the interior surface by said indentations.

52. The diffusion device of claim 43 wherein said exhaust gas conducting members are formed of a metal which has high heat conductivity.

53. The diffusion device of claim 43 including
an interior surface on said exhaust gas conducting member, and
an opening in said member for introducing cool air as a boundary layer adjacent said interior surface.

54. The diffusion device of claim 43 including means on said exterior surface to increase heat rejection from the exterior surface.

55. The device of claim 54 including
fins on the exterior surface of the gas conducting member.

56. The diffusion device of claim 43 wherein said gas conducting member has an elbow configuration.

57. The device of claim 54 including
a plurality of posts positioned on said exterior surface, and
openings between said posts to permit the flow of air with respect to the surfaces of the posts irrespective of the direction of relative movement of the said device and the cooling air.

58. The device of claim 57 wherein said posts have a rectangular configuration.

59. The device of claim 58 wherein said posts have a substantially square cross sectional configuration.

60. The device of claim 58 wherein said posts have an elongated rectangular cross sectional configuration.

61. The device of claim 57 wherein said posts have a triangular cross sectional configuration.

62. The device of claim 57 wherein said posts have a generally cruciform cross sectional configuration.

63. The device of claim 57 wherein said openings are positioned in both a longitudinal and a transverse direction with respect to said gas conducting member.

64. The device of claim 57 including openings between said posts positioned in a diagonal direction with respect to said gas conducting member.

65. The device of claim 57 wherein
said posts are positioned on the exterior surface in groups, and
openings positioned in both a longitudinal and a transverse direction with respect to said gas conducting member,
said openings separating said groups of posts, and
openings positioned diagonally with respect to said device with the diagonal openings separating the individual posts from other posts in its group.

66. The device of claim 65 wherein
each group contains two posts, and
the two posts in each group are separated by one diagonal opening.

67. The device of claim 65 wherein
each group contains four posts, and
the four posts in each group are separated by two intersecting diagonal openings.

68. The device of claim 57 including
openings in said posts to define internal surfaces therein.

69. The device of claim 68 wherein the openings in the posts are substantially circular.

70. The diffusion device of claim 54 including a reticulated metal foam on the exterior surface of the gas conducting member.

71. The diffusion device of claim 70 wherein said metal foam has a thickness of about ⅛ to about one inch.

72. The diffusion device of claim 70 wherein said metal foam has from about 5 to about 80 pores per inch.

73. The device of claim 54 including fins on said exterior surface with said fins having an undulating configuration.

74. The device of claim 73 including openings formed through said fins.

75. The device of claim 54 including a honeycomb structure on said exterior surface.

76. The device of claim 75 wherein said honeycomb structure is slotted.

77. The device of claim 76 wherein the slots in said honeycomb structure are positioned longitudinally with respect to said gas conducting member.

78. The device of claim 76 wherein the slots in said honeycomb structure are positioned both longitudinally and transversely with respect to said gas conducting member.

79. A device for conveying a heated gas comprising:
a metallic gas conduit having a high heat conductivity;
said metallic conduit having an interior surface and an exterior surface separated by a wall, an inlet for receipt of heated gases and an outlet for discharge of gases;
indentations in said interior surface to form recessed pockets therein;
said indentations having a width which is sufficiently small to impede the entrance of heated gas into said pockets, and
means to promote heat transfer through said wall in maintaining said conduit at a relatively low temperature with respect to the temperature of the heated gas.

80. A device for conveying a heated gas comprising:
a metallic gas conduit having a high heat conductivity;
said metallic conduit having an interior surface and an exterior surface separated by a wall, an inlet for receipt of heated gases and an outlet for discharge of heated gases;
said interior surface having a configuration which shields a portion of said interior surface against contact with heated gases passing through said member, and
means to promote heat transfer through said wall from said interior surface to said exterior surface, whereby heat transfer from the heated gas to said interior surface is reduced by the lack of contact between the heated gas and said shielded portions of the interior surface while heat received by the conduit at said interior surface is rapidly removed from the conduit by said second means to maintain said conduit at a relatively low temperature with respect to the temperature of said heated gas.

* * * * *